United States Patent [19]

Bailey

[11] Patent Number: 4,923,941
[45] Date of Patent: May 8, 1990

[54] CARBOXY-FUNCTIONAL POLYMERS AND THEIR USE AS DETERGENT ADDITIVES

[75] Inventor: William J. Bailey, University Park, Md.

[73] Assignee: American Cyanamid Company, Stamford, Conn.

[21] Appl. No.: 114,638

[22] Filed: Oct. 28, 1987

[51] Int. Cl.$^5$ .............................................. C08F 24/00
[52] U.S. Cl. .................................... 526/268; 526/270; 526/266; 526/257; 526/280; 522/168; 522/169
[58] Field of Search .............. 526/270, 268, 280, 257, 526/266; 522/169, 168

[56] References Cited

U.S. PATENT DOCUMENTS 4,530,746  7/1985  Azuma et al. ....................... 526/270

OTHER PUBLICATIONS

Am. Chem. Soc., Div. Polym. Sci., 28, 154 (1987).
J. Macromol. Sci.-Chem., A-21 (13 and 14), pp. 1611-1639 (1984).
J. Macromol. Sci.-Chem., A-21 (8 and 9), pp. 979-995 (1984).
Ann. NY Acad. Sci., 446, 42 (1985).
Makromol. Chem. Macromol. Symp. 6, pp. 81-100 (1986).
ACS Symposium Series No. 280 (1985).
6th International Symposium on the Stabilization and Controlled Degradation of Polymers, Lucerne, Switzerland (1984).

*Primary Examiner*—Joseph L. Schofer
*Assistant Examiner*—Alex H. Walker
*Attorney, Agent, or Firm*—Steven H. Flynn

[57] ABSTRACT

Carboxy-functional copolymers are prepared from acrylate and methylene-substituted-heterocyclic compounds which are biodegradable and exhibit strong metal ion chelating properties. Detergent compositions including such copolymers as detergent builders are also provided.

11 Claims, No Drawings

CARBOXY-FUNCTIONAL POLYMERS AND THEIR USE AS DETERGENT ADDITIVES

The present invention relates to carboxy-functional polymers having metal cation chelating ability and to detergent compositions, particularly fabric washing detergent compositions, containing containing such polymers. In particular it relates to novel copolymers of acrylates and 2-methylene-1,3-heterocyclics useful as detergent builders and to detergent compositions comprising at least one detersive surfactant and an effective amount of a detergent builder comprising said novel copolymers.

BACKGROUND OF THE INVENTION

Water normally contains alkali earth metal cations such as calcium, barium, magnesium, etc., and water "hardness" is directly related to the concentration of these cations in the water. Hard water reduces the effectiveness of detergents and soaps because these multivalent cations form insoluble salts with the anionic components of the detergent or soap, which precipitate from the detersive system and occlude dirt onto fabrics and form deposits ("scale") on sufaces and machine parts.

Detergent compositions generally contain one or more detergent builders capable of chelating or sequestering the multivalent cations. Detergent builders not only prevent the formation of insoluble precipitates (e.g., calcium soaps) but also improve detergency by deflocculating soil aggregates coagulated by the cations and breaking up the cation-enhanced binding of dirt to substrates.

Until the 1970's, the most widely used detergent builders were the condensed phosphates, especially sodium tripolyphosphate. However, with the discovery of the role of phosphates in the eutrophication of water systems, severe restrictions have been imposed on the use of phosphates in detergent compositions, and as a result there is a continuing need for the discovery of detergent builder compounds not based on phosphorus.

Many alternative detergent builders have been proposed, notably the alkali metal salts of nitrilotriacetic acid, e.g., trisodium nitrilotriacetate (NTA). Also, oxygen-based analogs of NTA, e.g., 1-oxacyclopropane-2,3-dicarboxylic acid and organic polymers such as polyacrylates, polymaleates, and polymethacrylates. See, e.g., U.S. Pat. Nos. 3,393,150, 3,666,664, 3,707,502, 3,839,215, and 4,067,816, all of which are incorporated herein by reference.

The aforementioned polymeric detergent builders are effective; however as a general rule their usefulness increases as their molecular weight increases and at high molecular weight, synthetic organic polymers give rise to further environmental concerns. This is because even though such polymers do not contribute any phosphorus to water systems, the organic polymers are not biodegradable and consequently remain in the environment, virtually unchanged, for an extremely long time.

A primary reason for the non-biodegradability of synthetic polymers is that since they do not occur in nature, no enzymes or microorganisms have yet evolved that can attack the synthetic polymer chains or utilize the polymers as food. Recent research indicates that the uninterrupted carbon backbone of common synthetic organic polymers is only sparingly susceptible to biological cleavage.

Recent research indicates that introduction of a hydrolyzable group such as an ester linkage into the backbone of organic addition polymers gives a copolyester which is biodegradable on a reasonable time scale but retains many of the physical properties of the original, non-biodegradable addition polymer. (See, e.g., W. J. Bailey, "The Design of New Biodegradable Polymers", *6th International Symposium on the Stabilization and Controlled Degradation of Polymers*, Lucerne, Swiz. (June 6, 1984); W. J. Bailey and B. Gapud, "Synthesis of Biodegradable Polyethylene", *American Chemical Society Symposium Series No. 280: Polymer Stabilization and Degradation*, pp. 423–31 (1985).

It has now been discovered that copolymers can be prepared from methylene-substituted heterocyclic compounds and acrylate compounds via a ring-opening addition reaction to provide high molecular weight, carboxy-functional polymers useful, e.g., as detergent builders. The copolymers are characterized by active carboxylic acid groups and also by repeated ester linkages in the organic polymer chain. The carboxy functionality of the copolymers makes them effective metal cation chelators, and the ester units in the copolymer chain make the copolymers biodegradable.

SUMMARY OF THE INVENTION

It is therefore an object of the present invention to provide a new class of copolymers.

It is a further object of the present invention to provide novel metal ion chelating agents useful, e.g., as detergent builders.

It is a further object of the present invention to provide a biodegradable detergent builder free of phosphorus.

It is a further object of the present invention to provide a novel detergent composition.

It is a further object of the present invention to provide a fabric-washing detergent composition that is effective in stain removal.

These and other objects are achieved, according to the present invention, by copolymers comprising repeating units of the formulas

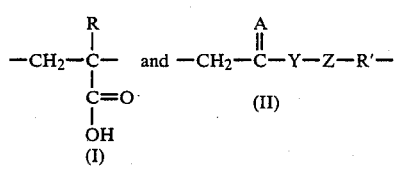

wherein
R represents hydrogen, lower ($C_1$–$C_6$) alkyl, or phenyl;
A is $=CH_2$ or $=O$;
Y is —O—, —S—, $C_1$–$C_6$ oxyalkylene, $C_1$–$C_6$ thioalkylene, or —COO—$(CH_2)_n$—, where n is 0, 1, 2 or 3;
Z is carbonyl if A is $=CH_2$ and otherwise is a direct bond or —$CR^2R^3$—, where $R^2$ and $R^3$ are, independently, hydrogen, $C_1$–$C_6$ alkyl or cycloalkyl, or $C_6$–$C_{10}$ aryl; and
R' is the direct bond or a divalent organic radical of up to about 12 carbon atoms, and may be, for example, alkylene, arylene, akenylene, cycloalkylene and cycloalkenylene, or the foregoing also containing hetero atoms such as oxygen and sulfur. R' may also include, as all or part of the radical, the segment

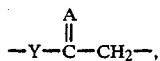

where Y and A are as previously defined. The nature of the R' radicals will be further understood from the description below of the methylene-substituted heterocyclic compounds from which polymer units (II) are derived.

Alkali metal salts of the copolymers, i.e., where the carboxy groups are salified, having the formula —COO$^-$M$^+$, M representing an alkali metal atom (Li, Na, K, etc.), are also contemplated.

Also contemplated herein are detergent compositions comprising one or more detersive surfactants and one or more detergent builders consisting of carboxy ester copolymers having repeating units of the formulas

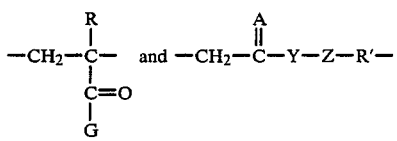

wherein
R represents hydrogen, lower ($C_1$–$C_6$) alkyl, or phenyl;
G represents —OH or —O$^-$M$^+$, where M is an alkali metal atom;
A is =$CH_2$ or =O;
Y is —O—, —S—, $C_1$–$C_6$ oxyalkylene, $C_1$–$C_6$ thioalkylene, or —COO—(CH$_2$)$_n$—, where n is 0, 1, 2 or 3;
Z is carbonyl if A is =$CH_2$ and otherwise is a direct bond or —CR$^2$R$^3$—, where R$^2$ and R$^3$ are, independently, hydrogen, $C_1$–$C_6$ alkyl or cycloalkyl, or $C_6$–$C_{10}$ aryl; and
R' is the direct bond or a divalent organic radical of up to about 12 carbon atoms.

DETAILED DESCRIPTION OF THE INVENTION

The biodegradable, carboxy-functional copolymers of the present invention are advantageously prepared by a ring-opening copolymerization of an acrylate compound of the formula H$_2$C=C(R)COOH or a salt thereof, where R is hydrogen, lower ($C_1$–$C_6$) alkyl or phenyl, with a vinyl-functional heterocyclic compound having the general formula

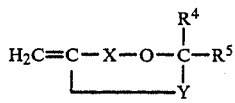

wherein
X is a direct bond or —CH$_2$—;
Y is —O—, —S—, $C_1$–$C_6$ oxyalkylene, $C_1$–$C_6$ thioalkylene, or —COO—(CH$_2$)$_n$—, where n is 0, 1, 2 or 3; and
R$^4$ and R$^5$ are, independently, hydrogen, $C_1$–$C_6$ alkyl, or phenyl, or R$^4$ and R$^5$, together with the carbon atom they are bound to (designated "C$^i$" in the formula below), form a $C_5$–$C_{12}$ cycloalkyl, cycloalkenyl or aryl radical, or a heterocyclic radical or a ring of the formula

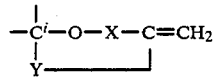

wherein X and Y are as defined above.

The resulting copolymers exhibit good metal cation chelating properties, and the insertion of ester linkages or thioester linkages into the polymer chain enhances the biodegradability of the copolymers.

Suitable methylene-substituted heterocyclic compounds will be any cyclic organic compound having a vinylidene

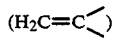

group and at least two hetero atoms in the ring, which compounds undergo a ring-opening addition copolymerization with the aforementioned acrylate compounds to form a copolymer characterized by ester (—COO—) or thioester (—COS—) linkages and also free carboxyl (or carboxylate) groups being inserted along the polymer chain.

Suitable 2-methylene-1,3-heterocyclic compounds include ethylene ketene acetal (2-methylene-1,3-dioxolane), 2-methylene-1,3-dioxepane, 3,9-dimethylene-1,5,7,11-tetraoxaspiro[5.5]undecane, 2-methylene-1,4,6-trioxaspiro[4.4]nonane, 2-phenyl-5-methylene-1,3-dioxan-4-one, 2,2-dimethyl-5-methylene-1,3-dioxan-4-one, 3-methylene-1,4-dioxane-2-one, and the like. Sulfur-substituted analogs of such compounds are also suitable, e.g., 2-methylene-1,3-oxathiolane.

During the reaction between the acrylate compound and the methylene-substituted heterocyclic compound, a ring-opening addition occurs in forming the copolymeric product. The aforementioned heterocyclic compounds typically are sensitive to acid, therefore the copolymerization is conducted in a neutral buffer, or a salt of the acrylate compound is employed. By way of illustration, a ring-opening copolymerization of an acrylate compound with some of the aforementioned methylenesubstituted heterocyclic comonomers would proceed as follows:

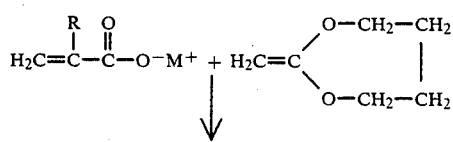

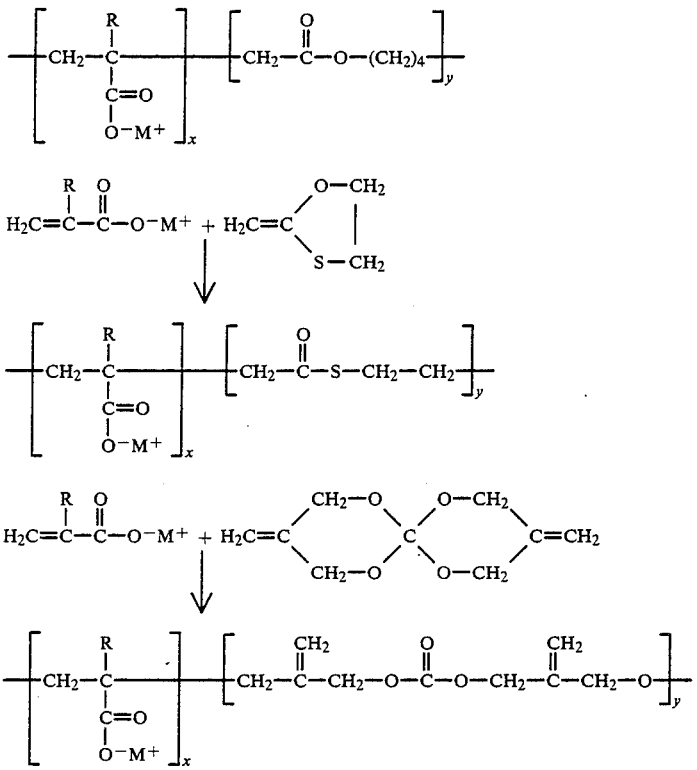

The value of x and y in the above reaction schemes will vary according to the relative proportions of the monomeric starting materials, and the resulting copolymers will typically also include units wherein the heterocyclic ring has not opened and only the two carbons of the vinylidene radical have been incorporated into the polymer chain. However, the presence and relative proportion of such unopened heterocyclic ring units may be controlled by varying the reaction conditions, e.g., in terms of temperature, reaction time, level of initiator, etc.

The copolymerization between the acrylate compound and the vinyl-functional heterocyclic compound takes place in the presence of a free radical polymerization initiator, which may include irradiation by electron beam or ultraviolet rays. Preferably, the copolymerization is carried out in the presence of an organic, peroxide of the formula ROOH or ROOR, in which R is an organic radical, and most preferably peroxides in which at least one peroxide oxygen is attached to a tertiary carbon atom. Preferred peroxide initiators include t-butyl hydroperoxide, cumene hydroperoxide, decaline hydroperoxide, di-t-butyl peroxide, benzoyl peroxide, dicumyl peroxide, 2,5-dimethyl-2,5-di(t-butyl peroxy) hexane, and the like.

As with any catalyst, any amount of the free radical intitator may be used which is effective to promote copolymerization of the monomeric starting materials discussed above. In the case of peroxide initiators, it is preferred to use from about 0.1% to about 5.0% by weight, based on the combined weight of the monomers. Most preferably, about 1.5 weight percent of a peroxide initiator will be employed.

The monomeric starting materials may be reacted by mixing them together in a reaction vessel, in a suitable solvent if desired, in the presence of the free radical initiator. Elevated temperatures, for example from about 40° C. to about 150° C., may be employed to increase the rate of reaction or to promote ring opening. The proportion of carboxy-functional acrylic acid units in relation to units derived from the heterocyclic compound may be varied according to the desires of the practitioner. In general, the acrylate monomer will be much more reactive than the heterocyclic compound This is especially true of the cyclic acetal reactants, such as 2-methylene-1,3-dioxepane. Accordingly, the relative proportion of the heterocyclic monomer will be increased against the more readily reactive acrylate in order to obtain the desired proportion of ester-containing units (derived from the heterocyclic monomer) in the final polymer.

It is believed that the copolymers of the present invention become slowly biodegradable by common soil microorganisms when the number of hetero atom- or ester linkage-containing polymer units is as low as about 2%. The copolymers are believed to be much more rapidly biodegraded when the percentage of ester linkage units is slightly higher, e.g., about 10%. In addition, the random structure of the copolymer leads to variability in the relative positions of the functional carboxylic acid groups along the copolymer chain. The randomly alternating structure of such copolymers may enhance their metal ion chelating effectiveness by providing different spacings between functional chelating groups, which, in turn, allows the copolymer to sequester a wider variety of metal cations. Most preferably the final copolymer will have upwards of 85 mole percent carboxy-functional units (derived from the acrylate monomer).

The molecular weight of the copolymers of the present invention can vary across a wide range, depending on the desires of the practitioner, e.g., from about 1500 to about 200,000 or more. For use as detergent builders, molecular weights above about 10,000 are preferred.

The copolymers may be isolated in any one of a number of known ways. For example, the product can be isolated by precipitation from a non solvent, such as acetone, and the precipitate filtered, washed and dried under vacuum to give the final polymer.

The carboxy-functional copolymers are active detergent builders and are advantageously included in a detergent composition, in accordance with the present invention. A detergent composition of this invention will contain at least one detersive surfactant. Such surfactants will be present in amounts usually encountered in detergent compositions, e.g., from about 1% to about 50% by weight, preferably about 5% to about 25% by weight for fabric-washing detergents, and most preferably from about 10% to about 20% by weight based on the total weight of the detergent composition. The surfactants may be anionic, nonionic, cationic or ampoteric, and mixtures of different detersive surfactants may be used. Non limiting examples of suitable detersive surfactants include:

(a) Anionic surfactants: soaps, i.e., alkali metal (preferably sodium or potassium) salts of long-chain fatty acids containing from 8 to 20 carbon atoms, such as lauric, myristic, oleic, palmitic, capric, caprylic, and stearic acids, used singly or in mixtures of differing chain lengths; alkali metal salts of organic sulfuric reaction products having long hydrocarbon chains of about 8 to about 20 carbon atoms and a radical selected from the group consisting of sulfonic acid and sulfuric acid ester radicals, such as sodium or potassium alkyl sulfates, preferably those obtained by sulfating higher ($C_8$–$C_{18}$) alcohols; sodium or potassium alkyl benzene-sulfonates in which the alkyl group contains from about 9 to about 20 carbon atoms, such as sodium linear alkyl ($C_{10}$–$C_{15}$) secondary benzenesulfonate, 2-phenyl-dodecanesulfonate, 2-phenyl-octadecanesulfonate and 3-phenyl-dodecanesulfonate; alkali metal (preferably sodium) olefin sulfonates, i.e., the mixture of detersive surfactants obtained from sulfonation of $C_8$–$C_{22}$ olefins, preferably straight-chain alpha-olefins; sodium alkyl glyceryl ether sulfonates, including ethers of higher alcohols derived from tallow coconut oil and synthetic alcohols derived from petroleum; sodium coconut oil fatty acid monoglyceride sulfates and sulfonates; sodium or potassium salts of sulfur acid esters of the reaction between higher fatty alcohols (e.g., tallow or coconut oil alcohols) and ethylene oxide; the esterification products of fatty acids with isethionic acid, neutralized with sodium hydroxide; and sodium or potassium salts of fatty acid amides of methyl taurine.

(b) Nonionic synthetic detersive surfactants: compounds formed by condensing ethylene oxide with hydrophobic base formed by the condensation of propylene oxide with propylene glycol; the polyethylene oxide condensates of alkyl-phenols, e.g., the condensation products of alkylphenols, having an alkyl group containing from about 6 to 12 carbon atoms in either a straight or branched chain, with ethylene oxide, said ethylene oxide being present in amounts equal to 5 to 25 moles of ethylene oxide per mole of alkylphenols (the alkyl substituent in such compounds may be derived from polymerized propylene, diisobutylene, octene, dodecene, or nonene, for example); compounds derived from the condensation of ethylene oxide with the product resulting from the reaction of propylene oxide and ethylenediamine, such as compounds containing from about 40% to about 80% polyoxyethylene by weight and having a molecular weight of from about 5,000 to about 11,000 resulting from the reaction of ethylene oxide groups with a hydrophobic base constituted of the reaction product of ethylenediamine and excess propylene oxide, said hydrophobic base having a molecular weight of the order of 2,500 to 3,000; the condensation product of aliphatic alcohols having from 8 to 18 carbon atoms, in either straight chain or branched chain configuration, with ethylene oxide, e.g., a coconut alcohol-ethylene oxide condensate having from 6 to 30 moles of ethylene oxide per mole of coconut alcohol, the coconut alcohol fraction having from 10 to 14 carbon atoms; long chain tertiary amine oxides corresponding to the following general formula, $R^1R^2R^3N=O$, wherein $R^1$ is an alkyl radical of from about 8 to 18 carbon atoms and $R^2$ and $R^3$ are each methyl, ethyl or hydroxyethyl radicals, such as dimethyldodecylamine oxide, dimethyloctylamine oxide, dimethyldecylamine oxide, diethyltetradecylamine oxide and dimethylhexadecylamine oxide, N-bis(hydroxyethyl)dodecylamine oxide; long chain tertiary phosphine oxides corresponding to the following formula $R^4R^5R^6P=O$, wherein $R^4$ is an alkyl, alkenyl or monohydroxyalkyl radical of 10 to 18 carbon atoms and $R^5$ and $R^6$ are each alkyl or monohydroxyalkyl groups containing from 1 to 3 carbon atoms, such as dimethyldodecylphosphine oxide, dimethyltetradecylphosphine oxide, ethylmethyltetradecylphosphine oxide, cetyldimethylphosphine oxide, dimethylstearylphosphine oxide, cetylethylpropylphosphine oxide, diethyldodecylphosphine oxide, diethyltetracylphonphine oxide, bis(hydroxymethyl)-dodecylphosphine oxide, bis(2-hydroxyethyl)-dodecylphosphine oxide, 2-hydroxypropylmethyltetradecylphosphine oxide, dimethyloleylphosphine oxide, and dimethyl-2-hydroxydodecylphosphine oxide; and dialkyl sulfoxides corresponding to the following formula, $R^7R^8S=O$, wherein $R^7$ is an alkyl, alkenyl, beta- or gamma-monohydroxy alkyl radical or an alkyl or beta-or gamma-monohydroxyoxyalkyl radical containing one or two other oxygen atoms in the chain, the $R^7$ groups ranging from 10 to 18 carbon atoms in chain length, and wherein $R^8$ is methyl, ethyl or alkylol, such as dodecyl methyl sulfoxide, tetradecyl methyl sulfoxide, 3-hydroxytridecyl methyl sulfoxide, 2-hydroxydodecyl methyl sulfoxide, 3-hydroxy-4-decyloxybutyl methyl sulfoxide, 3-hydroxy-4dodecyloxybutyl methyl sulfoxide, 2-hydroxy-3-decyloxy propyl methyl sulfoxide, 2-hydroxy-3-dodecyloxypropyl methyl sulfoxide, dodecyl ethyl sulfoxide, 2-hydroxydodecyl ethyl sulfoxide, dodecyl-2-hydroxyethyl sulfoxide.

(c) Ampholytic synthetic surfactants: derivatives of aliphatic secondary and tertiary amines, in which the aliphatic radical may be straight chain or branched chain and wherein one of the aliphatic substituents contains from about 8 to 18 carbon atoms and one contains an anionic water solubilizing group, such as sodium 3-dodecylaminopropionate, sodium 3-dodecylaminopropanesulfonate and sodium N-2-hydroxydodecyl-N-methyl-taurate.

(d) Zwitterionic synthetic surfactants: derivatives of aliphatic quaternary ammonium compounds, sulfonium compounds and phosphonium compounds in which the aliphatic radical may be straight or branched chain and wherein one of the aliphatic substituents contains from about 8 to 18 carbon atoms and one contains an anionic water solubilizing group, such as 3-(N,N-dimethyl-N-hexadecylammonio) propane-1-sulfonate, 3-(N,N-dimethyl-N-hexadecylammonio)-2-hydroxypropane-1-sulphonate, 3-(dodecylmethylsulfonium)propanesulfonate, and 3-(cetylmethylphosphonium)ethanesulfonate.

The detergent compositions of the present invention will contain, besides one or more detersive surfactants, about 10% to about 50% by weight of the composition, preferably about 20% to 40% by weight, of the carboxy-functional copolymer detergent builders described above.

In addition to the surfactants and the carboxy-functional copolymers, the detergent composition may also contain conventional detergent builders such as condensed phosphates, trisodium nitrilotriacetate (NTA), sodium carbonate, zeolites, sodium silicates, polyacrylates, polymaleates and the like. The combined detergent builders will make up from about 10% to about 50% by weight of the detergent composition. In addition to the essential detersive surfactants and copolymeric detergent builders, a detergent composition of the invention may also include such conventional ingredients as lather boosters (e.g., alkanolamides), fillers, antiredeposition agents, fluorescers, pigments, germicides, scents and enzymes.

A detergent composition according to the invention can be prepared by any conventional manufacturing technique used for preparing detergent compositions, such as a slurry of the common physical forms associated with detergents, such as powders, flakes, granules, noodles, cakes, bars and liquids.

The invention is further illustrated by the following examples, which should not be construed as limiting the scope of the invention.

EXAMPLE 1

Sodium acrylate (4.70 g) and 2-methylene-1,3-dioxepane (1.14 g) were added to a solution of 40 g of water containing 1.5 g of tetrabutylammonium bromide. The mixture was degassed and the reaction vessel placed in an oil bath. Ammonium persulfate (0.1 g) in 2.0 g of water was added while the mixture stirred. The reaction mixture was stirred 5 hours at a temperature of 90° C., after which the reaction mixture was poured into a large excess of acetone. A white precipitate was formed and collected by filtration, washed and dried in a vacuum oven at 50° C. overnight. A white solid product (4.6 g; 77% yield) was obtained. NMR analysis confirmed the presence of ester linkages in the copolymer chain.

The aforementioned patents and articles are incorporated herein by reference.

It will be understood that the foregoing description of the invention is susceptible to modifications, changes and adaptations, all of which are intended to be comprehended within the meaning and range of equivalents of the appended claims. For instance, though the foregoing description is directed to the use of the carboxy-functional copolymers in detergent systems, they will also find application in boiler water systems and other scale prevention uses, polymerization intermediates, and other embodiments where strong metal ion chelation is required.

I claim:

1. Biodegradable, carboxy-functional copolymers prepared by free radical-initiated copolymerization and consisting essentially of an acrylate compound of the formula $H_2C=C(R)COOH$, or a salt thereof, and a methylene-substituted heterocyclic compound having the formula

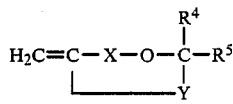

wherein
R is hydrogen, lower alkyl or phenyl; and wherein
X is a direct bond or —$CH_2$—;
Y is —O—, —S—, $C_1$–$C_6$ oxyalkylene, $C_1$–$C_6$ thioalkylene, or —COO—$(CH_2)_n$—, where n is 0, 1, 2 or 3; and
$R^4$ and $R^5$ are, independently, hydrogen, $C_1$–$C_6$ alkyl, or phenyl, or $R^4$ and $R^5$, together with the carbon atom they are bonded to, form a $C_5$–$C_{12}$ cycloalkyl, cycloalkenyl or aryl radical, a heterocyclic radical, or a ring of the formula

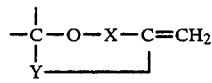

wherein X and Y are as defined above.

2. A copolymer according to claim 1, wherein said methylene-substituted heterocyclic compound is selected from the group consisting of 2-methylene-1,3-dioxolane, 2-methylene-1,3-dioxepane, 3,9-dimethylene-1,5,7,11-tetraoxaspiro[5.5]undecane, 2-methylene-1,4,6-trioxaspiro[4.4]nonane, 2-phenyl-5-methylene-1,3-dioxan-4-one, 2,2-dimethyl-5-methylene-1,3-dioxan-4-one, 3-methylene-1,4-dioxan-2-one, and 2-methylene-1,3-oxathiolane.

3. A copolymer according to claim 1, wherein said copolymer is derived from sodium acrylate and 2-methylene-1,3-dioxepane.

4. A copolymer according to claim 1, wherein said free radical initiator is selected from the group consisting of electron beam radiation, ultra violet radiation, and organic peroxides.

5. A copolymer according to claim 4, wherein the free radical initiator is a peroxide selected from the group consisting of t-butyl hydroperoxide, cumene hydroperoxide, decalin hydroperoxide, di-t-butyl peroxide, benzoyl peroxide, dicumyl peroxide, and 2,5-dimethyl-2,5-di(t-butylperoxy) hexane.

6. A copolymer according to claim 5, wherein greater than 85% of the copolymer units are derived from said acylate compound.

7. Biodegradable copolymers consisting essentially of repeating units of the formulas

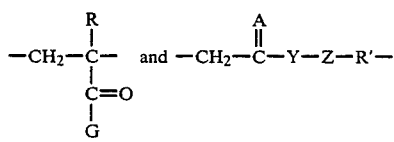

wherein
R represents hydrogen, lower alkyl, or phenyl;

G represents —OH or —O⁻M⁺, where M is an alkali metal atom;

A is =CH$_2$ or =O;

Y is —O—, —S—, C$_1$-C$_6$ oxyalkylene, C$_1$-C$_6$ thioalkylene, or —COO—(CH$_2$)$_n$—, where n is 0, 1, 2 or 3;

Z is carbonyl if A is =CH$_2$ and if A is =O is a direct bond or —CR$^2$R$^3$—, where R$^2$ and R$^3$ are, independently, hydrogen, C$_1$-C$_6$ alkyl or cycloalkyl, or C$_6$-C$_{10}$ aryl; and R' is the direct bond or a divalent organic radical of up to about 12 carbon atoms.

8. A copolymer according to claim 7, having a molecular weight of at least 1500.

9. A copolymer according to claim 8, wherein R is hydrogen, methyl or ethyl.

10. A copolymer according to claim 9, wherein A is =CH$_2$, Z is —CO—, Y is —CH$_2$—O—, and R' is —O—CH$_2$—C(=CH$_2$)—CH$_2$—O—.

11. A copolymer according to claim 9, wherein A is =O; Z is a direct bond or is —CH$_2$—, —C(CH$_3$)$_2$—, or —C(Ph)H—; Y is —COO—, —O—CH$_2$—, —O—CH$_2$CH$_2$CH$_2$—, —S—CH$_2$—, —CH$_2$—O—, or —COO—CH$_2$—; and R' is a direct bond.

* * * * *